June 6, 1950  R. V. HELLER  2,510,174
CONTROL LOADING SYSTEM FOR FLIGHT TRAINING APPARATUS
Filed July 3, 1946  6 Sheets-Sheet 6
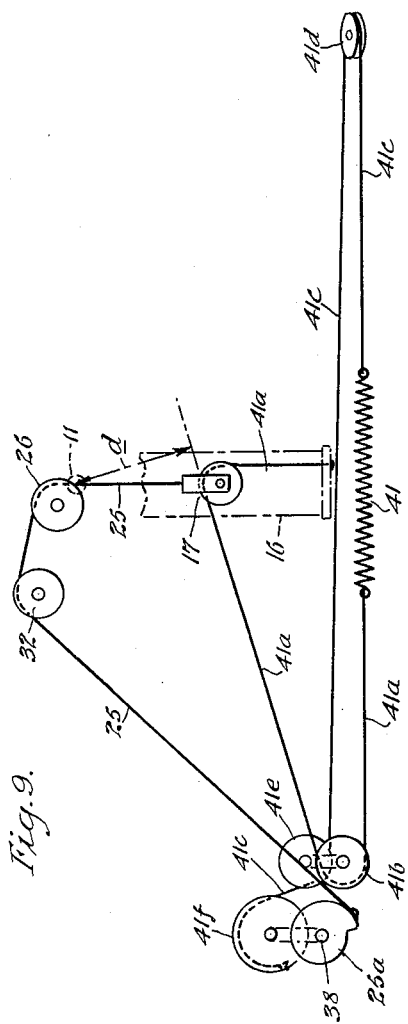
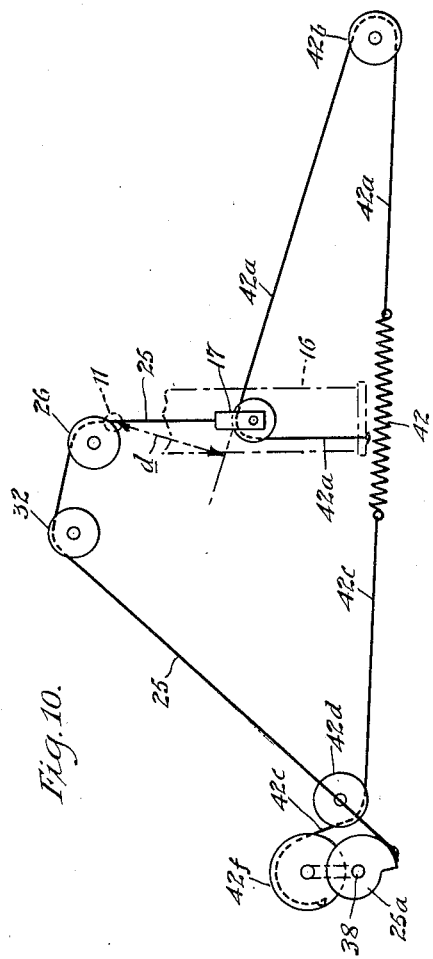
INVENTOR.
Richard V. Heller
BY
ATTORNEY Patented June 6, 1950

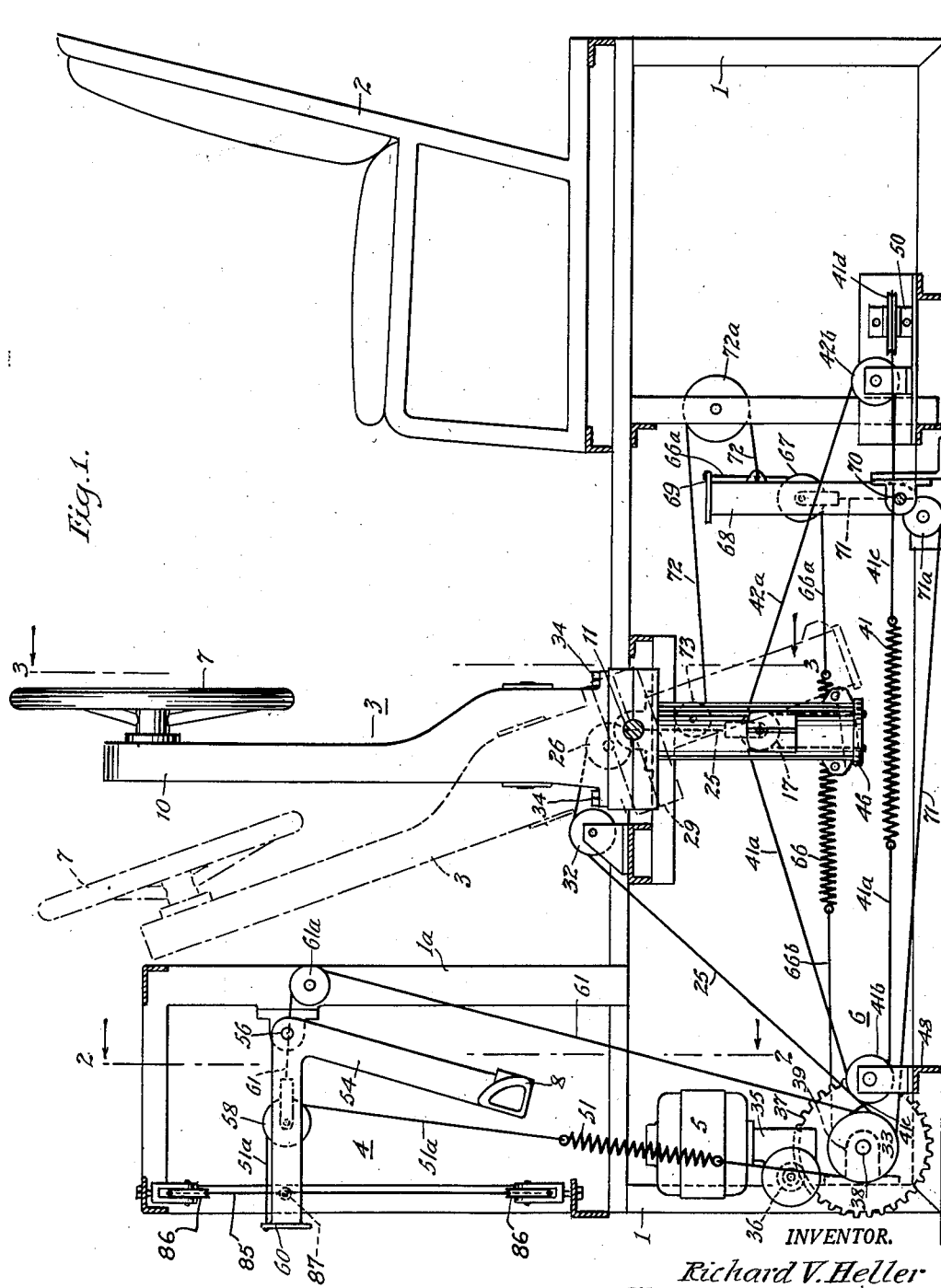

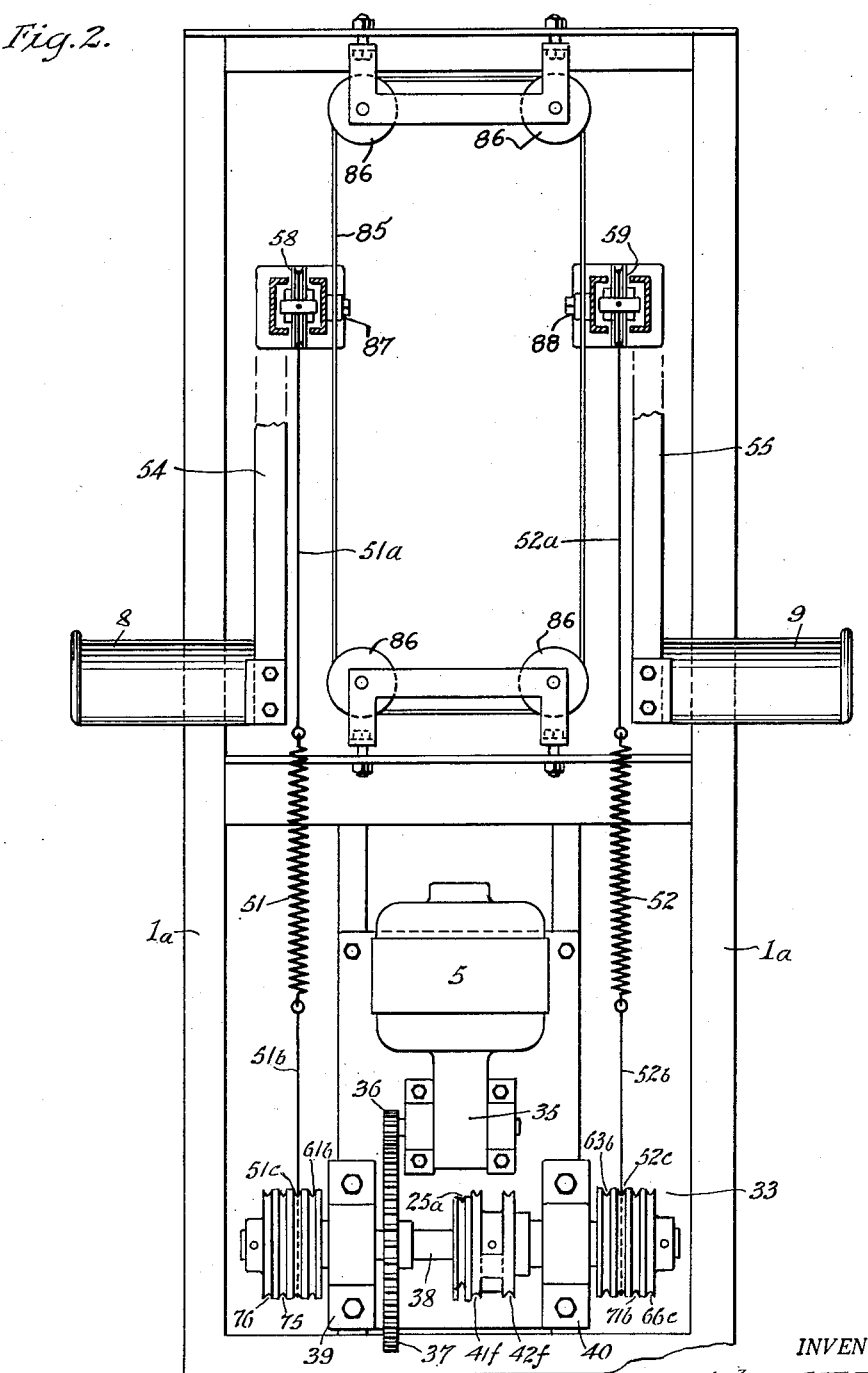

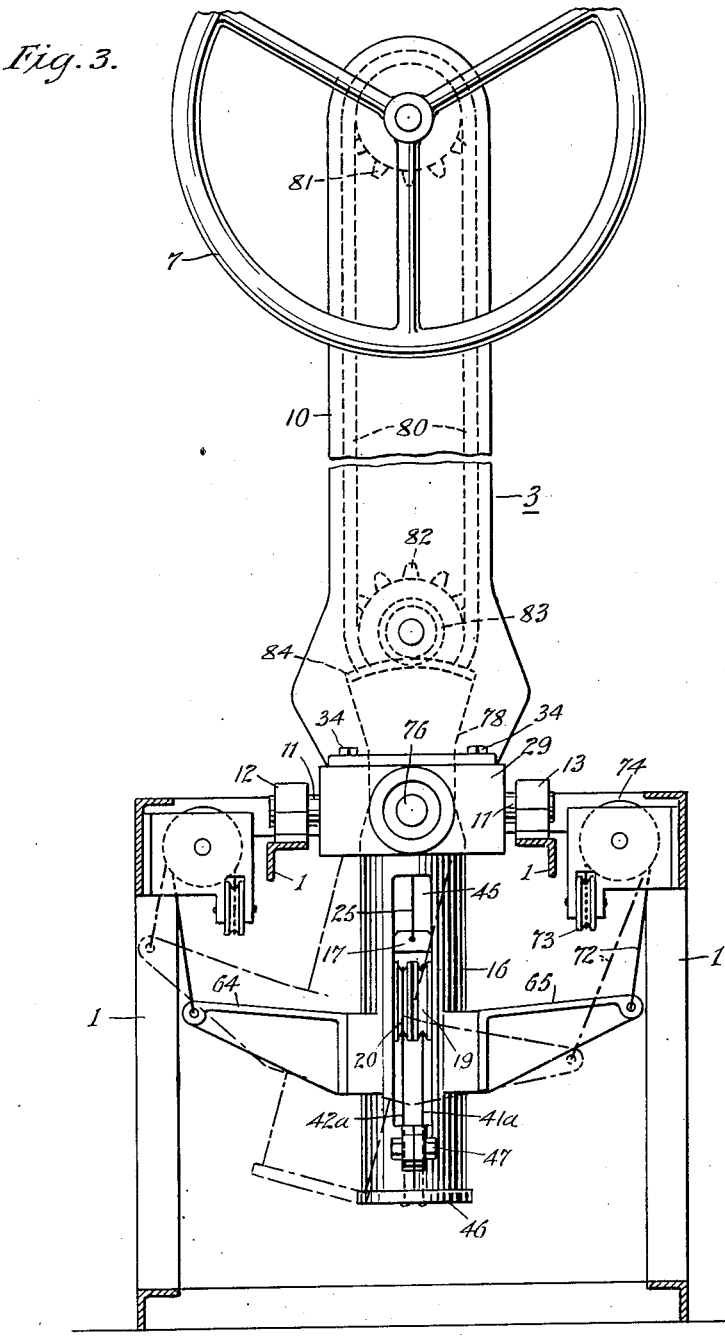

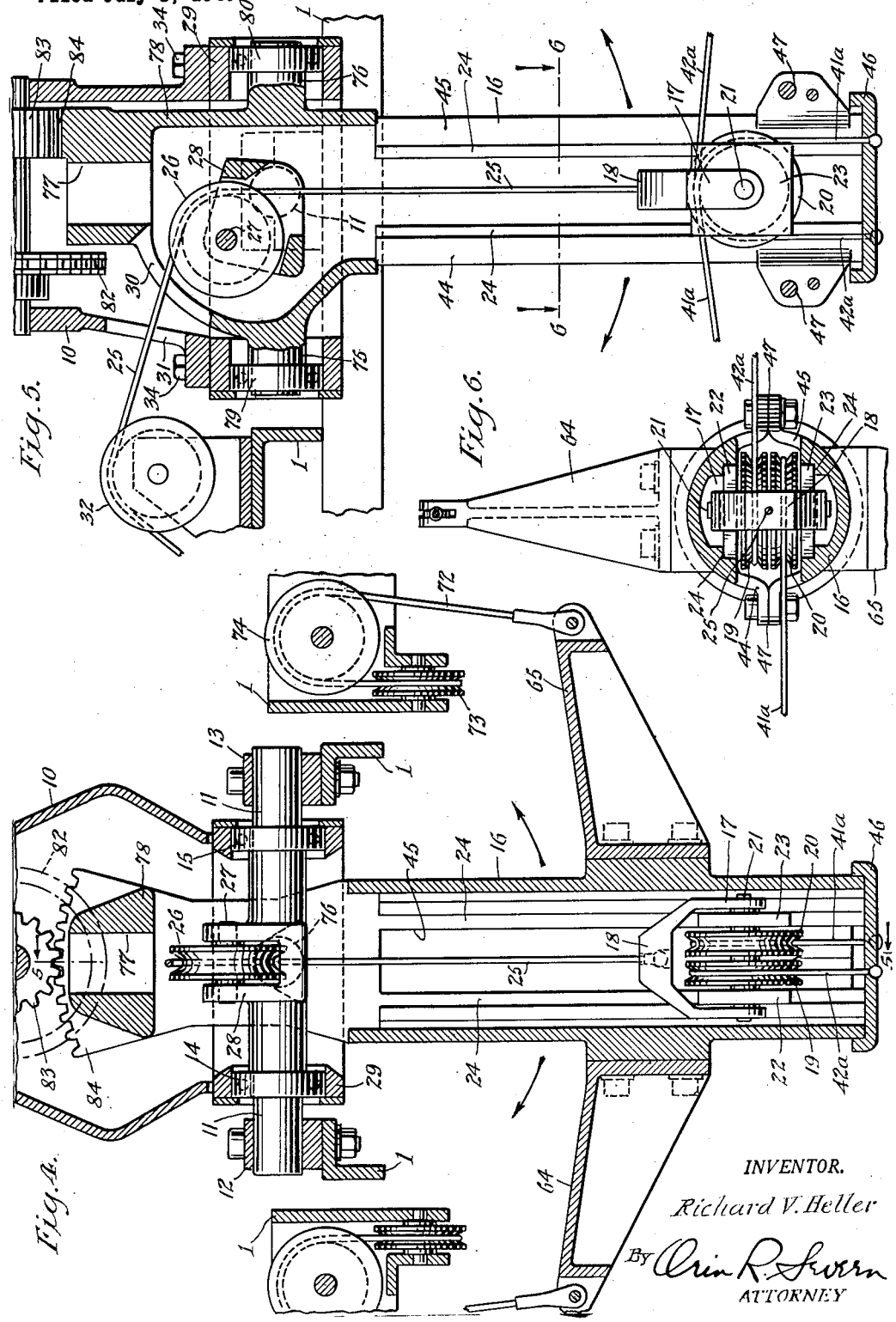

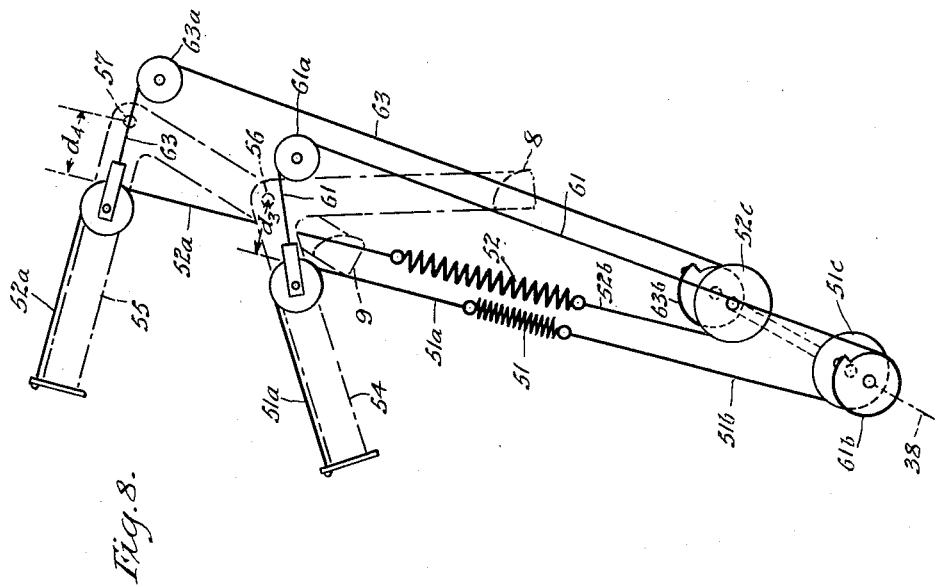
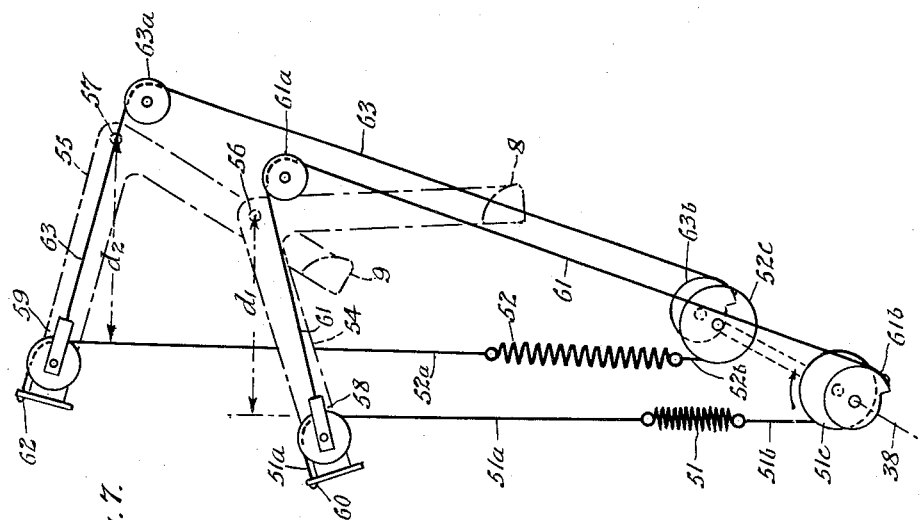

2,510,174

UNITED STATES PATENT OFFICE 2,510,174

CONTROL LOADING SYSTEM FOR FLIGHT TRAINING APPARATUS

Richard V. Heller, Troy, N. Y., assignor to Curtiss-Wright Corporation, a corporation of Delaware Application July 3, 1946, Serial No. 681,200

16 Claims. (Cl. 35—12)

This invention relates to grounded flight trainers of the type operable by simulated aircraft controls such as the elevator, ailerons and rudder, and particularly to a control loading system for such trainers for varying the resistance to control movement in accordance with variation in simulated air speed.

It has been proposed to apply opposing forces by means of springs, electromagnets and the like to the stick and rudder controls for example of grounded flight trainers for the purpose of simulating aircraft control resistance during flight caused by the air impinging on the active surfaces of the controls. A spring arrangement for simulating aircraft control resistance is disclosed and claimed in an application Serial No. 608,200, filed August 1, 1945, by R. W. Jenny and assigned to the same assignee as the present invention. Due to the fact that the aforesaid control resistance increases approximately as the square of the air speed, considerable force may be necessary to move the controls for a maneuver or change in direction when the aircraft is moving at very high speed, as in a dive for example. Accordingly in the case of training apparatus this resistance to movement, i. e., the control loading, should be varied to a proper degree and at the proper time during the simulated flight regardless of the extent of variation in air speed and the instant position of the controls. It is also very desirable that the force required to vary the control loading be for practical purposes substantially uniform and independent of the actual loading forces.

An object of this invention is to provide an improved control loading system for flight trainers of the aforesaid type that is arranged so as to vary the control loading in accordance with simulated air speed throughout the entire range of operation and arranged so that the expenditure of power for such control adjustment does not materially exceed that required to overcome the mechanical friction of the system.

A further object of the invention is to provide an improved control loading system having resistance springs for the loading of manual controls arranged to be adjusted by a comparatively low-powered motor so as to vary the degree of control loading without involving material stressing of said springs by said motor.

A further object of the invention is to provide improved control loading apparatus of the above character that is simple, compact and rugged in construction, efficient and quiet in operation and inexpensive both as to apparatus and maintenance.

The invention will be more fully set forth in the following description referring to the accompanying drawings, and the features of novelty will be pointed out with particularity in the claims annexed to and forming a part of this specification.

Referring to the drawings:

Fig. 1 is an elevational view partly in section taken from the side, of grounded flight training apparatus embodying the present invention;

Fig. 2 is a sectional view taken along the line 2—2 of Fig. 1 showing the cable drum assembly and the rudder control arrangement;

Fig. 3 is an elevational view of the control stick assembly including the manually actuated elevator and aileron controls taken along the line of 3—3 of Fig. 1;

Fig. 4 is an enlarged vertical sectional view of the lower pivoted portion of the control stick assembly taken from the front;

Fig. 5 is a similar view taken along the line 5—5 of Fig. 4;

Fig. 6 is a horizontal sectional view taken along the line 6—6 of Fig. 5;

Figs. 7 and 8 are partly diagrammatic views in perspective illustrating the operation of the control loading as applied to the rudder controls, and Figs. 9 and 10 are similar views illustrating the elevator control loading arrangement.

The flight training apparatus shown in Fig. 1 is of the grounded or emplaced type and comprises generally a rectangular supporting frame 1 constructed of angle and channel members, a seat 2 for the student pilot mounted on the frame at one end thereof, a control column or stick assembly 3 pivotally mounted on the frame near the midsection in proper relation to the seat 2, a rudder control assembly generally indicated at 4 mounted on the frame at the opposite end thereof, a motor 5 suitably operated according to change in simulated air speed of the trainer and a control loading system generally indicated at 6 operatively connected to the motor 5 for varying the simulated air resistance acting on the controls for different air speeds. In the usual operation of the device the pilot in the cockpit seat 2 operates the wheel 7, Figs. 1 and 3, for right or left aileron control, oscillates the control column 3 forward or backwards for elevator control (the stick assembly shown in the dotted line position in Fig. 1 for example being in the diving position), and rotates with his feet the pedals 8 and 9, Figs. 1 and 2, for rudder control, the above operation being in accordance with commonly accepted practice.

Referring first to the control stick assembly 3 a lever 10 generally in the form of a tubular column is secured to the bearing housing 29, as by bolts 34, said housing being pivotally supported in the frame on the transverse axis bearing shaft 11, Figs. 1 and 4, for movement of the lever toward and away from the pilot. The shaft 11 is secured to the frame by clamps 12 and 13, Figs. 3 and 4, and is provided with ball bearings 14 and 15 on which the stick assembly can oscillate. The wheel 7 which is rotatably carried at the upper end of the lever 10 is grasped by the pilot to push or pull the lever 10 for elevator control, and is also rotated for operating the aileron controls in a manner hereinafter described.

The lower end of the control column or stick assembly below the pivot shaft 11 comprises a slotted tubular extension 16 carried by the housing 29. The extension is laterally adjustable with respect to the lever 10 in accordance with aileron control but for the sake of clearness will be considered as an integral part of the lever 10 in the description of the elevator control. This integral lever is acted upon by a spring force through a varying lever arm for changing the elevator control loading, and to this end the extension 16 carries a shiftable structure 17, Figs. 4 and 6, comprising a yoke 18 and a pair of pulleys 19 and 20 mounted on a pivot pin 21 between a pair of rectangular guide plates 22 and 23 embraced by the depending arms of the yoke. These guide plates may if desired be replaced by rollers and the term "slider" as used in the specification and claims is intended to include any suitably guided shiftable structure. The slider 17 is guided for vertical reciprocal movement toward and away from pivot shaft 11 in channels or grooves 24 formed along the inner sides of the extension 16 as best shown by Fig. 6. Briefly, the slider is positioned by means of the motor 5 and a cooperating cable and spring combination indicated at 6 for varying the lever arm, the slider also being associated with spring structure adapted to be stressed when the control column 10 is moved away from its neutral position toward a climb or dive position.

In particular, the yoke 18 is connected as shown in Fig. 4 to a flexible member, such as a rope or cable 25 that extends upward through the tubular extension 16 to a guide pulley 26 that is pivoted at 27 on a bracket 28. This bracket forms an offset integral connection between the adjoining ends of the shaft 11 in the manner of a crankshaft so as to avoid interference with the centrally disposed cable 25, Fig. 5. The cable is guided from the member 16 including its support 78 through alined openings 30 and 31 in the stick assembly parts 78 and 10 respectively over another idler pulley 32 to a sheave of the cable drum assembly 33, Fig. 1, where it is anchored so that rotation of the drum in one direction winds up the cable and causes the slider 17 to be raised for example, and in the opposite direction pays out the cable so that the slider may be lowered.

The cable drum assembly including the shaft 38 positioned in fixed bearings 39 and 40 is shown by Fig. 2 wherein it is operated from the motor 5 through speed reducing mechanism 35, drive pinion 36 and driven gear 37 which is secured to the shaft 38. In the interest of clearness, only the rudder control loading cables are shown connected to the drum assembly in Fig. 2.

Referring particularly to Figs. 9 and 10 which show separate detail views of each spring and cable system of the elevator control, a pair of similar elevator loading springs 41 and 42 disposed in generally parallel arrangement beneath the stick or control column assembly are connected to the stick extension 16 by cables 41a and 42a respectively. In order to identify more clearly each cable system, the various cables, pulleys and drum sheaves associated with a certain spring will be designated by reference characters associated with the reference numeral of the spring. The spring 41 only of the elevator control is shown in Fig. 1 in order to avoid confusion.

The cables extend from opposite directions through the slots 44 and 45 respectively in the extension 16, over the slider pulleys 20 and 19 to the end wall 46 where they are anchored, Figs. 4 and 5. The lower end of the tube 16 is split in line with the slots 44 and 45 which extend nearly to the top and bottom thereof so that the slider and cables may move through the proper range in the tube. The halves of the lower split end of the tube are clamped together as shown at 47. The cable 41a, Figs. 1 and 9, is led around the guide pulley 41b mounted on a fixed bracket 48 in the frame and is connected to one end of the spring 41, the other end of the spring being connected to a cable 41c that is led around the guide pulley 41d mounted for rotation in a horizontal plane on a fixed bracket 50. The cable 41c is then led back to the fixed idler pulley 41e and to the upper periphery of the drum sheave 41f to which it is anchored. The cables 25 and 41c connected to the slider 17 and to the spring 41 respectively are anchored to the respective drum sheaves 25a and 41f, Figs. 2 and 9, so that rotation of the drum in a given direction winds up one cable and unwinds the other.

The companion spring 42, referring to Fig. 10, is, as above described connected at one end to the cable 42a which is led around the fixed guide pulley 42b and slider pulley for connection to the extension 16. The other end of the spring 42 is connected to a cable 42c that is guided by the idler pulley 42d to the upper periphery of the drum sheave 42f to which it is anchored. As in the previous instance the slider and spring cables connected to the drum are arranged so that one cable is wound up as the other is being unwound for a purpose presently described.

From the foregoing description it will be seen that for a given position of the slider 17 the spring 41 is stressed and the spring 42 relaxed when the stick is pushed forward to the "dive" position and the spring 42 is stressed and the spring 41 relaxed when the stick is pulled back to the "climb" position, the spring force in each case acting in opposition to the stick movement through a lever arm $d$ measured from the line of force acting on the slider pulley to the pivotal axis at 11. In accordance with the present invention this lever arm $d$ rather than the spring force, is varied with change in air speed so that the drum actuating motor 5 is called upon to do little more than overcome the mechanical friction of the system including the cables, idler and guide pulleys, and slider 17; in other words the springs are stressed only by the pilot and for all practical purposes are not stressed by the motor 5 during shifting of the slider position, even when the air speed changes while the stick and other controls are being operated by the pilot.

When the air speed is decreased for example, the position of the slider is changed so as to shorten the lever arm $d$ and thereby decrease the force required of the pilot to operate the stick about pivot 11, and to this end the drum shaft 38 is rotated by the motor so that the sheave 25a winds up the cable 25 to lift the slider 17 toward the stick pivot 11, and the sheaves 41f and 42f unwind and pay out the spring cables 41c and 42c. Accordingly the slider position is changed without the operation in itself causing tensioning of either elevator spring. When the lever arm $d$ is lengthened in accordance with increasing air speed the motor load is substantially the same since the slider cable 25 is paid out and the spring cables taken up. Slack in the slider cable is taken up by spring pressure on the slider.

Although the taking up of cable 25 for example can be exactly compensated by the paying out of cables 41c and 42c, or vice versa, at a given control position of the stick, preferably at an intermediate or average point between neutral and a maximum position, it will be apparent that there will be a slight difference at the extreme positions causing slight tensioning of the springs. This difference can be readily compensated by providing a suitable cam surface for the slider sheave periphery as indicated by the contour of 25a in Figs. 9 and 10 so that the cable 25 is wound up at constant torque thereby imposing no additional burden on the motor.

A description of the control of the motor 5 is not necessary for a complete understanding of the present invention, it being sufficient to state that the motor is energized so as to rotate in one direction or the other to an extent depending on the magnitude of the increase or decrease in simulated air speed. It will be understood that for the purposes of the present invention the motor 5 may be electrically, mechanically or pneumatically operated as desired.

The rudder control loading system is shown by Figs. 7 and 8 which illustrate the loading for maximum air speed and low air speed respectively. Referring first to Fig. 7 which shows a "right rudder" position, the springs 51 and 52 associated with the rudder pedals 8 and 9 respectively are connected to the slider and drum sheaves in generally the same manner as the elevator springs above described. The rudder pedals are formed as bell cranks 54 and 55 pivotally mounted at 56 and 57 on the frame extension 1a, Figs. 1 and 2, the outer arms of the bell cranks carrying the sliders 58 and 59.

The spring 51 is connected at one end to a cable 51a that is guided over the pulley of slider 58 to the extremity of the crank lever 54 where it is anchored at 60. The other end of the spring is connected to a cable 51b that is anchored to the drum sheave 51c. The slider 58 is connected to a cable 61 that is guided over a pulley 61a to the drum sheave 61b where it is anchored. Similarly, the spring 52 is connected at one end to a cable 52a that is led over the pulley of slider 59 and anchored at 62 to the crank 55, and at the other end to a cable 52b that is anchored to the drum sheave 52c; and the slider 59 is connected to a cable 63 led around pulley 63a to the drum sheave 63b where it is anchored. The relaxed spring 51 therefore acts on the crank 54 through the lever arm $d_1$ and the tensioned spring 52 acts on the crank 55 through the lever arm $d_2$ to resist the "right rudder" operation of the pilot.

For the purpose of maintaining the rudder pedals in proper relation to each other the cranks 54 and 55 are interconnected by a cable loop 85, Figs. 1 and 2, that is guided by the frame supported pulleys 86 and secured at 87 and 88 to the crank arms respectively.

Accordingly it will be seen that rotation of the drum shaft at 38 in a clockwise direction in response to material decrease in air speed for example winds up the cables 61 and 63 so as to draw the sliders 58 and 59 closer to the pivots 56 and 57 respectively thereby shortening the lever arms, Fig. 8, so that less foot pressure is required of the pilot at the rudder controls to overcome the simulated air resistance. While the slider cables are being wound up, the spring cables 51b and 52b are being unwound so as to compensate for taking up of the slider cables and thereby avoid tensioning of the springs by the motor. In the low speed position shown in Fig. 8 which is for the same amount of "right rudder" as in Fig. 7, the relaxed spring 51 acts on the crank 54 through a lever arm $d_3$ as compared with $d_1$, and the tensioned spring 52 acts on the crank 55 through a lever arm $d_4$ as compared with $d_2$. The drum sheaves 51b and 63b may be suitably contoured at the winding periphery to compensate for any difference in motor torque required for the taking up and paying out of the slider and spring cables as previously explained.

The aileron control loading also follows the same general principles of the stick and rudder loading and therefore need not be shown in complete detail. It is sufficient to state that a pair of springs are operatively connected to lateral arms 64 and 65 secured to opposite sides of the stick extension 16, Fig. 4, so as to load the lateral movement of the stick extension when it is rocked sidewise in response to aileron control in a manner presently described. One of the aileron springs 66 is shown in Fig. 1 connected at one end to a cable 66a that is led over the pulley of slider 67 of the aileron loading lever 68 and anchored to the free end of said lever at 69, the other end of the spring being connected by a cable 66b to the drum sheave 66c, Fig. 2. The lever 68 is pivotally mounted on one side of the frame at 70 for movement parallel to the longitudinal axis of the frame. The slider 67 is connected to a cable 71 that is led around fixed pulley 71a to the drum sheave 71b where it is also anchored.

The aileron loading lever 68 is also connected to the stick extension arm 65 by a cable 72 that is led around fixed pulley 72a to a pair of guide pulleys 73 and 74 mounted in the frame at right angles to each other for suitable connection to the arm 65, Fig. 4. A similar lever at the opposite side of the frame (not shown) is also connected in the same manner to the extension arm 64, and corresponding slider and spring cables are connected to respective drum sheaves 75 and 76 as indicated in Figs. 1 and 2. The spring cable 66b associated with the loading lever 68 is shown connected to the cable drum 33 in Fig. 1, but the corresponding aileron cables are omitted in Fig. 2 in the interest of clearness.

The stick assembly insofar as the elevator control is concerned, has been considered as an integral unit pivoted for forward or backward movement about the pivot 11. The aileron control may be combined with the stick in conventional manner, either by supporting the entire stick assembly in the well-known gimbal mounting, in which case the lever 10 is removed from the bearing housing 29 and the conventional "stick" is inserted instead in the socket 77 formed in the casting 78 to which the extension 16 is secured; or by mounting the lever 10 directly on the housing 29 so that it is held against sidewise movement, and tilting instead the lower extension 16 by means of the hand wheel 7. In the former case for example the gimbal mounting for the stick assembly includes the transverse axis shaft 11 on which the bearing housing 29 is mounted, and a longitudinal axis support comprising trunnions 75 and 76 which are integral with the casting 78, Fig. 5, rotatably mounted on ball bearings 79 and 80 in the bearing housing 29 about an axis perpendicular to the axis of pivot 11.

Where it is preferred to use the hand wheel 7 for aileron control the wheel is connected to the extension 16 by means of a sprocket chain 80 which engages sprocket wheels 81 and 82 connected respectively to the hand wheel 7 and to a pinion 83 mounted in the tubular lever 10 so as to mesh with a segmental gear 84 carried by the casting 78. Rotation of the hand wheel therefore produces through the chain and sprocket connection corresponding tilting of the extension 16 about the trunnions 75 and 76 so as to stress through the lateral arms 64 and 65 and associated cables the right or left elevator loading spring as the case may be, as indicated in the dotted line position in Fig. 3. It will therefore be apparent that operation of the stick assembly for a maneuver involving a combined dive and turn for example stresses the corresponding elevator and aileron springs to an extent simulating air resistance at both the elevator and aileron control surfaces.

In the "no-load" position where the air speed is zero or very low as in a "stall," the slider of each control is positioned so close to its associated fulcrum that no material stressing of the loading springs takes place when the pilot operates the controls, thereby simulating the "sloppy" feel of the controls characteristic of such conditions.

An important advantage of this invention in changing the mechanical leverage of the spring force acting on the manually operated controls so as to simulate change in air resistance, rather than in changing the amount of spring force itself is that a material reduction in size, weight and cost of the electrical equipment is made possible by the use of a small motor having sufficient rating merely to overcome the mechanical friction of the system. The associated motor control switches and circuits are also simple and inexpensive by reason of the low current rating thereof. Accordingly the operation of the entire equipment is comparatively quiet and smooth due to lighter loading on the actuating parts.

Although springs are shown as the loading elements of the invention it will be apparent that any suitable resilient structure may be used, such as rubber or the like, and the term "spring" as used herein in the specification and claims is intended to include such structure. Also, the term "cable" is intended to comprehend any suitable flexible connection.

It should be understood that this invention is not limited to specific details of construction and arrangement thereof herein illustrated, and that changes and modifications may occur to one skilled in the art without departing from the spirit of the invention.

What is claimed is:

1. In flight training apparatus the combination of a manually actuated lever associated with a simulated aircraft control, means movably mounted for adjustment along said lever with respect to its fulcrum, spring structure for resisting manual movement of said lever according to the length of the lever arm between said fulcrum and said adjustable means, and actuating means operatively connected to both said adjustable means and said spring structure adapted to be actuated in accordance with variation in simulated aircraft air speed for shifting the position of said adjustable means, the operative connection between said spring structure and said adjustable means being adapted for compensating movement of said adjustable means so that the tension of said spring structure is substantially constant during change in simulated airspeed whereby the control loading on said lever is varied according to the length of said lever arm and the work required from said actuating means is limited substantially to that required to overcome the mechanical friction of the system.

2. In aircraft training apparatus the combination of a manually actuated lever, a slider element mounted on the lever for adjustment along the length thereof with respect to its fulcrum, spring structure operatively connected to said lever and controlled by said slider element for resisting manual movement of said lever according to the length of the lever arm between said fulcrum and said slider element, and motive means operatively connected to both said slider element and said spring structure actuated in accordance with variation in simulated air speed of the aircraft for shifting the position of said slider element, the connection between said motive means and said slider element and spring structure compensating movement of said slider element so that the tension of said spring structure is substantially constant during change in simulated airspeed whereby the control loading on said lever is varied in accordance with said simulated air speed.

3. In aircraft training apparatus the combination of a manually actuated lever, means movably mounted on the lever for adjustment with respect to its fulcrum, resilient means operatively connected to said lever for resisting a control movement thereof through a lever arm determined by the position of said movable lever means, a motor positioned in accordance with variation in simulated air speed of the aircraft and means separately connecting said motor to said movable lever means and to said resilient means respectively arranged so that operation of said motor is effective to change the position of said movable lever means with respect to said fulcrum and to compensate movement of said movable lever means so that there is no material stressing of said resilient means.

4. In aircraft training apparatus the combination of a manually actuated lever, means mounted on the lever for adjustment with respect to its fulcrum, a spring operatively connected to said lever and arranged to act thereon at a point determined by the position of said means for resisting a control movement of said lever, a motor actuated in accordance with variation in simulated air speed of the aircraft and means separately connecting said motor to said lever mounted means and to said spring respectively arranged so that operation of said motor is effective to change the position of said lever mounted means with respect to said fulcrum for varying the loading on said control and to compensate movement of said lever mounted means for maintaining substantially constant the tension of said spring.

5. In aircraft training apparatus the combination of a manually actuated lever, means movably mounted on the lever for adjustment with respect to its fulcrum, a spring operatively connected to said lever for resisting a control movement of said lever according to the position of said movable means, a motor actuated in accordance with variation in simulated air speed of the aircraft and means including a pair of flexible members separately connecting said motor to said movable lever means and to said spring respectively arranged so that operation of said motor is effective to change the position of said movable means with respect to said fulcrum through one of said flexible members coincident with adjustment of the other flexible member thereby compensating movement of said movable means so as to maintain substantially constant the tension of said spring.

6. In aircraft training apparatus the combination of a manually actuated lever, a slider element positioned on the lever for adjustment with respect to its fulcrum, spring structure operatively connected to said lever and arranged to act thereon at a point determined by the position of said slider element for resisting a manual control movement of said lever, a motor actuated in accordance with variation in simulated air speed of the aircraft and means separately connecting said motor to said slider element and to said spring structure respectively arranged so that operation of said motor is effective to change the position of said slider element with respect to said fulcrum for varying the loading on said control and to shift said spring structure bodily to compensate adjustment of said slider element whereby the tension of said spring structure is maintained substantially constant.

7. In aircraft training apparatus the combination of a manually actuated lever associated with a simulated aircraft control, a slider element positioned for adjustment along the length of said lever with respect to its fulcrum, a spring operatively related at one end to said slider element and said lever for resisting a control movement of said lever according to the adjusted slider element position, a rotatable compensating member, a plurality of flexible members arranged to be wound and unwound by said rotatable member and connected to said slider element and the other end of said spring respectively for changing the position of said slider element while maintaining the tension of said spring substantially constant, and means actuated in accordance with variation in simulated air speed of the aircraft for controlling said rotatable member whereby the control loading on said lever is varied in accordance with simulated air speed.

8. In aircraft training apparatus the combination of a manually actuated lever associated with a simulated aircraft stick control, a slider element positioned for adjustment along said lever with respect to its fulcrum, a pair of springs each operatively connected at one end to said lever and arranged to act thereon at a point determined by the position of said slider element for resisting a manual control movement of said lever, said springs arranged to act in opposite directions on said lever, a motor actuated in accordance with variation in simulated air speed of the aircraft and cable means separately connecting said motor to said slider element and to the other end of each spring respectively arranged so that operation of said motor is effective to change the position of said slider element with respect to said fulcrum for varying the loading on said control and to shift said springs to compensate adjustment of said slider element whereby the tension of said springs is maintained substantially constant.

9. In aircraft training apparatus the combination of a manually actuated lever associated with a simulated aircraft stick control, a slider element positioned for adjustment along said lever with respect to its fulcrum, a pair of springs each operatively connected at one end to a respective cable secured to said lever, each cable being guided by said slider element and arranged to act on said lever through a lever arm determined by the position of said slider element for resisting a manual control movement of said lever, a motor for positioning said slider actuated in accordance with variation in simulated air speed of the aircraft and a pair of other cables separately connecting said motor to the opposite ends of said springs respectively, said cables arranged so that operation of said motor is effective to wind up said other cables while moving said slider in one direction, and vice versa, so as to change the position of said slider element with respect to said fulcrum for varying the loading on said control and to shift said springs to compensate adjustment of said slider element whereby the tension of said springs is maintained substantially constant during said adjustment.

10. In aircraft training apparatus the combination of a manually actuated lever, means mounted for adjustment along the length of said lever with respect to its fulcrum, spring structure operatively related to said lever mounted means and said lever respectively for resisting a control movement of said lever according to the position of said means, motive means actuated in accordance with variation in simulated air speed of the aircraft, a rotatable compensating member controlled by said motive means, and a plurality of flexible members, each of which has one end connected to said rotatable member and the other end connected to said spring structure and lever mounted means respectively, arranged so that rotation of said member in response to variation in air speed is effective to shift the position of said lever mounted means with respect to said fulcrum for varying the lever arm acted upon by said spring and to compensate movement of said lever mounted means to maintain substantially constant the tension of said spring structure.

11. In aircraft training apparatus the combination of a manually actuated lever, a slider element mounted on the lever for adjustment along the length thereof toward and away from its fulcrum, spring structure operatively connected to said lever for resisting a control movement of said lever, said spring structure being controlled by said slider element so as to act on said lever at varying distances from said fulcrum, motive means actuated in accordance with variation in simulated air speed of the aircraft, a rotatable compensating member controlled by said motive means, and a plurality of flexible members each of which has one end connected to said rotatable member and the other end connected to said spring structure and slider element respectively, arranged so that rotation of said member in response to variation in air speed is effective to shift the position of said slider element with respect to said fulcrum for varying the lever arm acted upon by said spring coincident with adjustment of the respective flexible member to compensate movement of said slider element and maintain substantially constant the tension of said spring structure.

12. In aircraft training apparatus the combination of a manually actuated lever, an element mounted on said lever for movement toward and away from the fulcrum thereof, a motor actuated in accordance with variation in simulated air speed of the aircraft, rotatable means controlled by said motor, a flexible member interconnecting said rotatable means and said element arranged so that rotation of said motor in a direction of decreasing air speed causes movement of said element toward said fulcrum, and spring structure connected by a flexible member at one end to said rotatable means and at the other end by a flexible member to said lever, said element being arranged to control said last-named flexible member so that said spring structure acts on said lever through the distance between said element and said fulcrum, said last-named flexible member also arranged so as to urge said element in a direction away from said fulcrum, said flexible members being related to said rotatable means so that movement of said element with respect to said fulcrum in response to variation in air speed causes compensating adjustment of the flexible members connected to said spring structure so as to maintain substantially constant the spring tension during said adjustment.

13. In aircraft training apparatus the combination of a manually actuated lever associated with a simulated aircraft stick control, a slider element mounted for adjustment along the length of said lever with respect to its fulcrum, and a motor controlled spring system operatively connected to said lever and slider element for resisting a control movement of said lever according to a lever arm determined by the distance between said slider element and said fulcrum, including a motor actuated in accordance with variation in simulated air speed of the aircraft, a rotatable compensating member controlled by said motor, a plurality of fixed pulleys arranged at opposite sides of said fulcrum and generally alined therewith, a pair of springs each having one end connected by a flexible member guided by respective pulleys to said rotatable member and having the other end connected by a flexible member to said lever, said last-named flexible member being guided on and positioned by said slider element, and a flexible member connecting said rotatable member and said slider element, said rotatable member and flexible members being arranged so that variation in said lever arm in response to variation in simulated air speed control is accompanied by corresponding compensation of the flexible members so as to maintain the spring tension substantially constant.

14. In aircraft training apparatus the combination of a manually actuated lever, a slider element mounted on said lever for movement toward and away from the fulcrum thereof, means actuated in accordance with variation in simulated air speed of the aircraft, a plurality of cable sheaves controlled by said means, a cable interconnecting said element and one of said sheaves and a spring connected by a cable at one end to another of said sheaves, a cable connected to the other end of said spring and around said element to said lever where it is secured so as to act on said lever through the distance between said element and said fulcrum, said cables being related to said sheaves so that rotation of said sheaves in a direction of decreasing air speed causes movement of said slider element toward said fulcrum, and vice versa, coincident with compensating adjustment of the cables connected to said spring so as to maintain substantially constant the spring tension during said adjustment.

15. In aircraft training apparatus the combination of a plurality of pilot actuated members each simulating an aircraft control, a lever operable according to the manipulation of each of said members, a slider element mounted on each lever for movement toward and away from the fulcrum thereof, means actuated in accordance with variation in simulated air speed of the aircraft, a plurality of cable sheaves controlled by said means, cables interconnecting a respective sheave and each of said elements and spring structure for resisting movement of each lever respectively, cables interconnecting respective sheaves and spring structure and also interconnecting respective spring structure and levers, a lever connected cable being guided by the respective slider element so as to act on said lever through the distance between said element and said fulcrum, said cables being related to said sheaves so that rotation of said sheaves in a direction of decreasing air speed causes movement of the respective slider elements toward the fulcrum, and vice versa, coincident with compensating adjustment of the cables connected to said spring structure so as to maintain substantially constant the spring tension during said adjustment.

16. In aircraft training apparatus having simulated aircraft controls, means for loading a respective control so as to simulate air resistance encountered at varying air speeds of the aircraft comprising a lever rotatable about a pivot in accordance with the pilot's manipulation of the respective control, means shiftable along said lever toward and away from its pivot, a loading spring, a cable interconnecting the free end of said lever and one end of said spring and guided by said shiftable means so as to bias said lever through a variable lever arm, a plurality of cable sheaves arranged to be positioned in accordance with simulated air speed, a cable interconnecting one of said sheaves and the other end of said spring and a cable interconnecting another of said sheaves and said shiftable means, said cables arranged so that the spring cable is paid out so as to maintain substantially constant the spring tension as the shiftable means cable is taken up, and vice versa, whereby the loading lever arm is adjustable coincident with compensating adjustment of the spring cable.

RICHARD V. HELLER.

REFERENCES CITED

The following references are of record in the file of this patent:

UNITED STATES PATENTS

| Number | Name | Date |
|---|---|---|
| 2,099,857 | Link | Nov. 23, 1937 |
| 2,316,181 | Ocker | Apr. 13, 1943 |
| 2,341,253 | West | Feb. 8, 1944 |
| 2,385,095 | McCarthy | Sept. 18, 1945 |

FOREIGN PATENTS

| Number | Country | Date |
|---|---|---|
| 158,522 | Great Britain | 1918 |